(12) United States Patent
Rogers et al.

(10) Patent No.: US 11,170,131 B1
(45) Date of Patent: Nov. 9, 2021

(54) DIFFERENTIALLY PRIVATE TOP-K SELECTION

(71) Applicant: Microsoft Technology Licensing, LLC, Redmond, WA (US)

(72) Inventors: Ryan M. Rogers, Sunnyvale, CA (US); David Anthony Durfee, San Francisco, CA (US); Sean S. Peng, Sunnyvale, CA (US); Ya Xu, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/527,987

(22) Filed: Jul. 31, 2019

Related U.S. Application Data (60) Provisional application No. 62/844,656, filed on May 7, 2019.

(51) Int. Cl.
*G06F 21/00* (2013.01)
*G06F 21/62* (2013.01)
*G06F 16/9035* (2019.01)

(52) U.S. Cl.
CPC ...... *G06F 21/6263* (2013.01); *G06F 16/9035* (2019.01); *G06F 21/6227* (2013.01)

(58) Field of Classification Search
CPC .............. G06F 21/6263; G06F 16/9035; G06F 21/6227
See application file for complete search history.

(56) References Cited

U.S. PATENT DOCUMENTS

| | | | | |
|---|---|---|---|---|
| 7,424,426 B2* | 9/2008 | Furui | ................... | G10L 15/065 704/250 |
| 8,601,024 B2* | 12/2013 | Kenthapadi | ......... | G06F 16/9535 707/776 |
| 8,627,488 B2* | 1/2014 | Cormode | ............ | G06F 21/6254 726/26 |
| 2011/0208763 A1* | 8/2011 | McSherry | ........... | G06F 21/6263 707/757 |
| 2013/0145473 A1* | 6/2013 | Cormode | ......... | G11B 20/00086 726/26 |
| 2017/0109544 A1* | 4/2017 | Chen | ................... | G06F 21/6254 |
| 2017/0169253 A1* | 6/2017 | Curcio | ................ | G06F 21/6254 |
| 2017/0235974 A1* | 8/2017 | Zhang | .................... | G06F 17/18 726/26 |
| 2018/0239925 A1* | 8/2018 | Nerurkar | ............. | G06F 21/6254 |
| 2019/0065775 A1* | 2/2019 | Klucar, Jr. | ........ | G06F 16/24554 |

* cited by examiner

*Primary Examiner* — Maung T Lwin
(74) *Attorney, Agent, or Firm* — Nicholson De Vos Webster & Elliott LLP (57) ABSTRACT

Techniques for ensuring differential privacy in top-K selection are provided. In one technique, multiple items and multiple counts are identified in response to a query. For each count, which corresponds to a different item, a noise value is generated and added to the count to generate a noisy value, and the noisy value is added to a set of noisy values that is initially empty. A particular noise value is generated for a particular count and added to the particular count to generate a noisy threshold. The particular noise value is generated using a different technique than the technique used to generate each noise value in the set. Based on the noisy threshold, a subset of the noisy values is identified, where each noisy value in the subset is less than the noisy threshold. A response to the query is generated that excludes items that correspond to the subset.

20 Claims, 4 Drawing Sheets

DIFFERENTIALLY PRIVATE TOP-K SELECTION

CROSS-REFERENCE TO RELATED APPLICATIONS; BENEFIT CLAIM

This application claims the benefit of Provisional Application 62/844,656, filed May 7, 2019, the entire contents of which is hereby incorporated by reference as if fully set forth herein, under 35 U.S.C. § 119(e).

TECHNICAL FIELD

The present disclosure relates to data security and, more particularly to, top-k selection over a domain subject to user-level differential privacy.

BACKGROUND

Determining the top-k most frequent items from a massive dataset in an efficient way is one of the most fundamental problems in data science. However, it is important to consider users' privacy in the dataset, since results from data mining approaches can reveal sensitive information about a user's data. For example, a person might query a database for the top ten articles that were engaged (e.g., liked, commented, shared) by CEOs in India. The same person might query the database again for the top ten articles that were engaged by CEOs in India or the CEO of Company A. Looking at the difference between the results of these two queries would reveal the online activity of an individual (i.e., the CEO of Company A). Simple thresholding techniques (such as k-anonymity) do not provide formal privacy guarantees, since adversary background knowledge or linking datasets may cause someone's data in a protected dataset to be revealed.

Differential privacy has become the gold standard for rigorous privacy guarantees in data analytics. One of differential privacy's benefits is that the privacy loss of a computation on a dataset can be quantified. One approach to implementing differential privacy requires querying the count of every domain element, such as reporting a noisy max or implementing an exponential mechanism. However, such an approach requires knowing the entire domain. In some use cases, knowing the entire domain at query time is impractical, since the domain may be changing continuously, such as in the case of user-generated content from a user base of millions of active users. Another approach requires building an additional structure on top of a large data domain, which involves significant processing time and extra storage to build and maintain the additional structure.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for providing differential privacy in top-k selection are provided. In one technique, a query is processed that results in identifying multiple data items, each with an associated count. Instead of providing the data items in response to the query, noise is first calculated and added to each count, which results in a set of noisy counts, which may result in a different ranking of the data items. For a particular count, specific noise is calculated and added thereto to generate a noisy threshold. Any data item whose noisy count is less than the noisy threshold is removed from the result set. Identification of the remaining data items (if any) are returned as a result of the query. Thus, there may be scenarios where no results are returned.

Embodiments improve computer technology; namely, ensuring data privacy in an efficient and robust manner. Embodiments provide rigorous privacy techniques for determining top-k frequent data items (or elements) that can be built on top of highly distributed, real-time systems that might already be in place. Embodiments involve practical and approximate differentially private techniques that do not require any structure on the data domain. In an embodiment, techniques described herein work in the setting where data is preprocessed prior to running the techniques so that the differentially private computation only accesses a subset of the data while still providing user privacy in the full underlying dataset. Additionally, embodiments allow responding to queries of one or more data sources in real-time (e.g., under one second) while providing differential privacy.

Restricted and Unrestricted Sensitivity Settings

Differentially private techniques disclosed herein return the top-k results by querying the counts of elements in the dataset. To ensure user level privacy where protection of the privacy of a user's entire dataset that might consist of many data records is sought, two different settings are considered: a Δ-restricted sensitivity setting and an unrestricted sensitivity setting. The type of setting is significant when ensuring differential privacy. Generally, the more a user's influence (e.g., as reflected in their profile or as reflected in their online actions/behavior) can change the result of a query, the more noise is needed. In the Δ-restricted sensitivity setting, a user is able to modify the counts by at most 1 across at most a fixed number of elements in a data domain, which is assumed to be known a priori. An example of such a setting would be computing the top-k countries where users have a certain skill set. Assuming a user can only be in one country, delta (Δ)=1. In the more general setting, unrestricted sensitivity is considered where a user can modify the counts by at most one across an arbitrary number of elements. An example of the unrestricted setting would be computing the top-k articles with distinct user engagement (liked, commented, shared, etc.). Here, a single user may potentially engage with all known (and unknown) online articles.

Differential Privacy System

Figure 1:
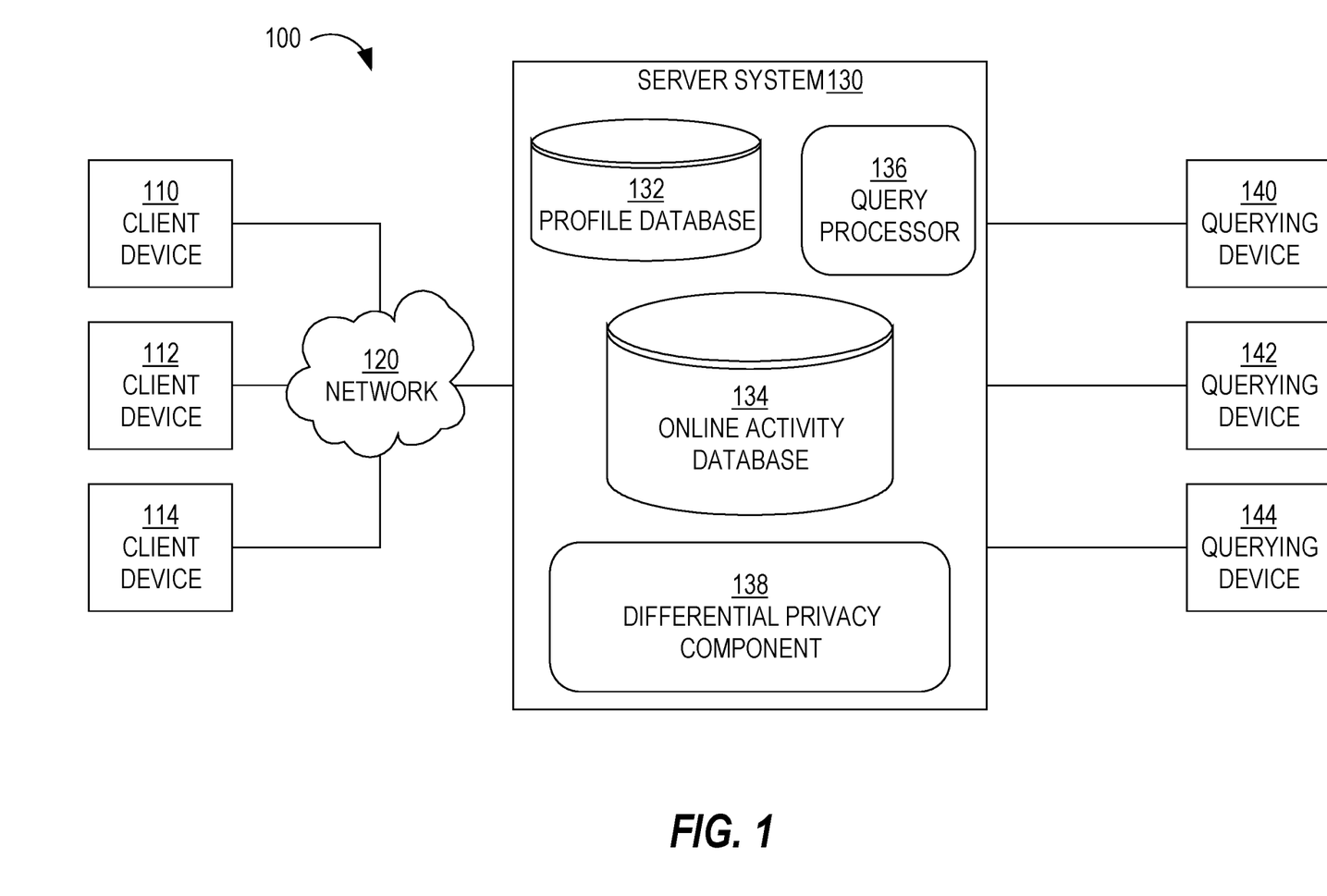
FIG. 1 is a block diagram that depicts an example system that provides differential privacy, in an embodiment.

FIG. 1 is a block diagram that depicts an example system 100 that provides differential privacy, in an embodiment. System 100 includes client devices 110-114, a network 120, a server system 130, and querying devices 140-144. Client devices 110-114 are operated by end-users and send data and/or requests to server system 130 over network 120. Server system 130 comprises a profile database 132, an online activity database 134, a query processor 136, and a differential privacy component 138. Although depicted separately from query processor 136, differential privacy component 138 may be a component of, or implemented in, query processor 136. Also, in other embodiments, server system 130 excludes profile database 132 or online activity database 134.

Profile database 132 comprises searchable data that client devices 110-114 may access. Online activity database 134 comprises searchable data (e.g., in the form of digital records) that server system 130 generates based on online activities of users of client devices 110-114 with respect to server system 130. Such online activities may include pages viewed, content items selected, videos viewed, forms filled, user session durations, and queries submitted. A digital record of an online activity may include an identity of a user that initiated the online activity, an IP address of a client device involved in the online activity, a device identifier (e.g., a MAC address) of the client device, and a timestamp of the online activity. Digital records of online activities may be deleted or anonymized after a certain period of time, such as 14 days.

Querying devices 140-144 initiate queries that involving accessing databases 132-134. Databases 132-134 may be stored on one or more storage devices (persistent and/or volatile) that may reside within the same local network as server system 130 and/or in a network that is remote relative to server system. Thus, although depicted as being included in server system 130, each storage device may be either (a) part of server system 130 or (b) accessed by server system 130 over a local network, a wide area network, or the Internet.

Databases

In a social networking context, server system 130 is provided by a social network provider, such as LinkedIn, Facebook, or Google+. In this context, each profile in profile database 132 includes a user profile, each provided by a different user. A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

While many examples herein are in the context of online social networking, embodiments are not so limited.

Embodiments are not limited to the type of data that databases 132-134 store or the type of requests that client devices 110-114 might submit. For example, a database included in server system 130 may include information about multiple content delivery campaigns, where each campaign is associated with a single party or entity that provides the campaign (or "campaign provider"). An example of such content is advertisements and an example of a campaign provider is an advertiser. An individual representing a campaign provider and operating querying device 140 may submit one or more requests for information about content delivery campaigns that are being managed by server system 130, such as how the content delivery campaigns are performing, which ones are still active.

Data Items

Data items are the entities that are requested by users operating querying devices 140-144. Example data items include any piece of electronic content (e.g., articles, videos), countries, organizations (e.g., companies, academic institutions, publishers), events, organization characteristics (e.g., number of employees, industry, number of offices), user characteristics (e.g., skill, employer, job title, geographic location, academic degree), etc. The data items are items that have associated counts, such as the top-k articles engaged by users with a job title of Software Engineer, the top-k Asian countries whose users have performed a particular action (e.g., purchased a particular product or service, visited a particular website, or registered for a particular event), the top-k live video events logged into by users residing in a particular state. The articles are the data items in the first example, the Asian countries are the data items in the second example, and the live video events are the data items in the third example.

Example queries include: top 50 employers in terms of hiring people from an Ivy League school; top 10 countries with the most users contributing content to server system 130; top 20 articles that have been engaged with by CEOs from North America; top 10 skills of users that work at three particular tech companies; top 25 universities that produce graduates with a degree in Computer Science and that are currently employed. The data items of these example queries are, respectively, employers, countries, articles, skills, and universities.

Queries

Queries may be formulated in one or more ways. For example, server system 130 provides a user interface to querying devices 140-144. Users operating querying devices 140-144 may make selections and/or input text into fields of the user interface. As another example, users manually specify the entire query in text in a search field. In such a scenario, the users may be presented with one or more examples of queries that may be submitted to server system 130.

Users of querying devices 140-144 may first be registered with server system 130 and, thus, have an account therewith. Users of querying devices 140-144 may have to first provide credentials (e.g., a username and password) in order to submit queries. Also, each account may be associated with a budget (described in more detail below) that dictates how many queries may be processed and answered by server system 130 and/or how much data may be returned in response to the queries.

Query Processor

Query processor 136 may be implemented in software, hardware, firmware, or any combination thereof. Query processor 136 receives and processes queries, or requests, from querying devices 140-144. Querying devices 140-144 are operated by users that desire to view information about online activity related to one or more types of data items.

Processing a query may involve accessing profile database 132 and/or online activity database 134 in order to generate preliminary results of the query. Processing a query may also involve aggregating the preliminary results in order to generate the requested top-k data items. For example, if a query requests the top ten articles commented on in the last week, then online activity database 134 may be accessed to identify all the instances of a comment on an article where the timestamp indicates a time within the last week. Then, the number of comments of each article are determined by aggregating the comments on a per article basis. Lastly, the articles are ordered based on number of comments and the top ten articles are identified.

Instead of providing the identified results directly (e.g., the top ten articles in the last example), differential privacy component 138 generates noisy values based on the actual/real numbers of comments of the top ten articles. Differential privacy component 138 reorders the top ten articles based on the noisy values and query processor 136 transmits the identities of the reordered articles (or a subset thereof, as described in more detail below) to the querying device that transmitted the corresponding query. Differential privacy component 138 may be implemented in software, hardware, or any combination of software and hardware.

Query Hashing

Query processor 136 may also store (1) queries received from querying devices 140-144 along with (2) their corresponding noisy results. This is referred to as "hashing" the query results. This hashing technique ensures that if the same query is received again from the same querying device or same user, then the querying device/user will receive the same noisy results. This "hashing" technique has multiple benefits: it conserves computing resources for queries that have not been seen before, it provides the query results very quickly, and it ensures that the noisy results are consistent. If a query result is not hashed, then a querying device that submits the same query multiple times may see the order of query results change from query result to query result since, across different instances of the same query, different noisy values would be generated for same data items. Thus, the query initiator may derive what the true query result (or true order) might be.

Process for Providing Differential Privacy

Figure 2:
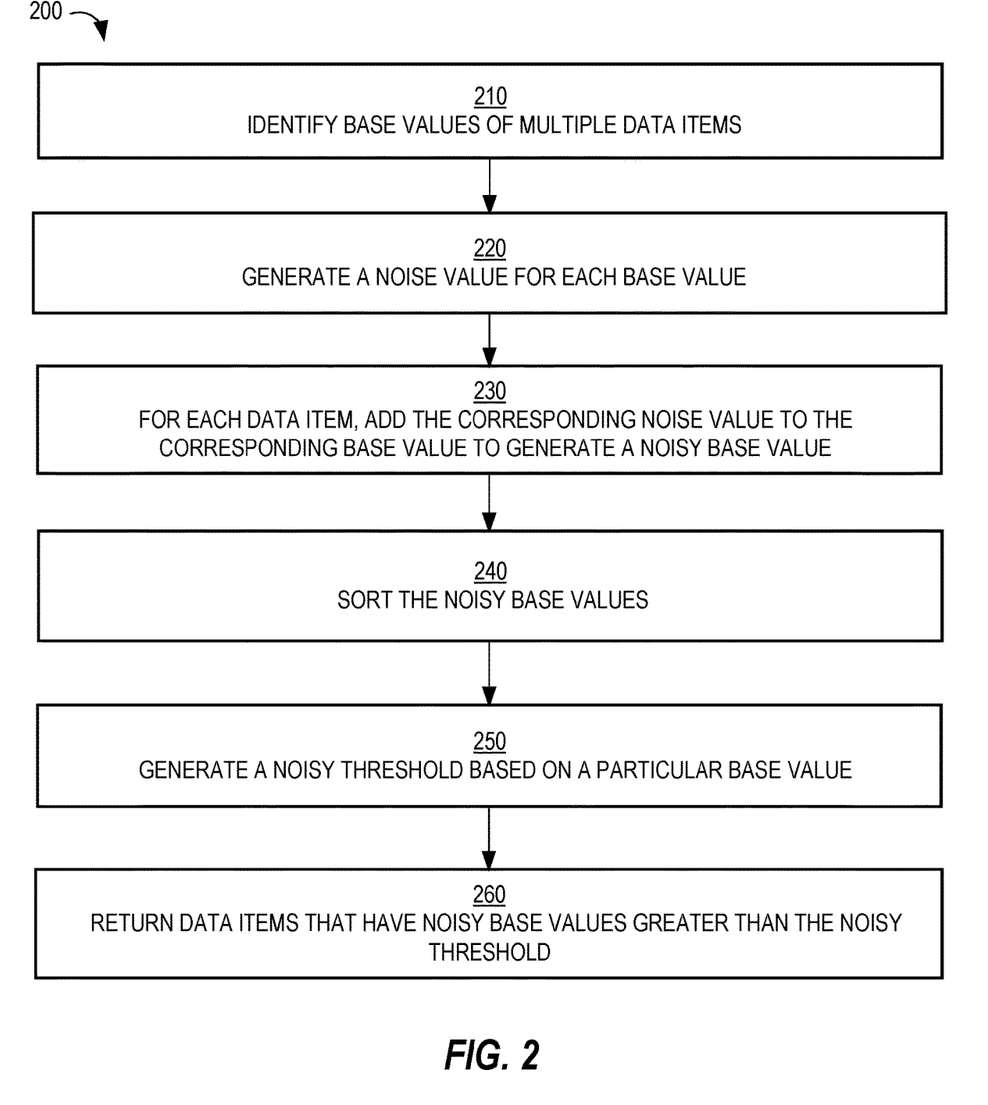
FIG. 2 is a flow diagram that depicts an example process for providing differential privacy, in an embodiment.

FIG. 2 is a flow diagram that depicts an example process 200 for providing differential privacy, in an embodiment. Process 200 may be implemented by different components of system 100. For example, query processor 136 may implement block 210, while differential privacy component 138 may implement blocks 220-250.

At block 210, base values of multiple data items are identified. The base values represent real or actual values (e.g., counts), before any noise is added the base values. Block 210 may be performed in response to a query. The underlying data upon which the plurality of base values have been derived may be pre-processed data, such that there exists many data items that are not being considered, in order to respond to the query in real-time or near real-time. For example, the top k* engaged articles are identified prior to receiving queries requesting top-k articles that satisfy certain criteria. Then, when such a query is received, criteria of the query (e.g., CEOs in the Finance Industry in North America) is used to filter the top k* engaged articles to compute the top-k articles that satisfy the query criteria. k* may be much less than all possible engaged articles. For example, k* may be 8,000 when all possible engaged articles may be over 300,000 or may be unknown.

Figure 3A:
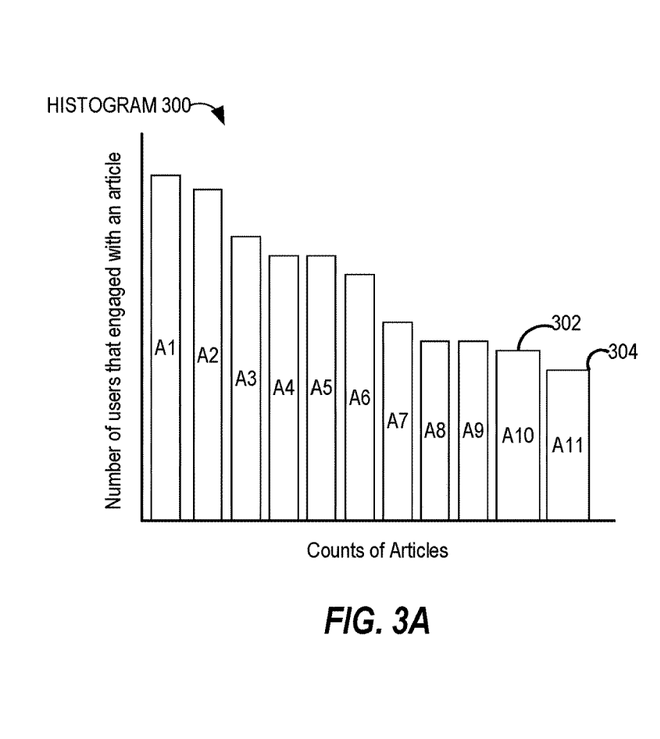
FIGS. 3A-3B are diagrams that depict example histograms that comprise multiple counts, each corresponding to a different data item, in an embodiment.

Block 210 may involve sorting the identified base values. The base values may be organized as, or viewed as, a histogram. FIG. 3A is a diagram that depicts an example histogram 300 that comprises eleven counts, each corresponding to a different data item, such as an article. In this example, each count reflects a number of users that have engaged with the corresponding article. Count 302 refers to the tenth most engaged article in terms of number of users, while count 304 refers to the eleventh most engaged article in terms of number of users.

At block 220, a noise value is generated for each identified base value. In an embodiment, the technique used to generate the noise value depends on the sensitivity setting. For example, for the unrestricted sensitivity setting, a Gumbel noise generating technique is used; whereas for the Δ-restricted sensitivity setting, a Laplace noise generating technique is used. Some noise values may be negative while other noise values may be positive.

In an embodiment where a Gumbel noise generating technique is used, a noise distribution is considered from a Gumbel random variable, where Gumbel(b) has PDF $p_{Gumbel}(z; b)$ and $p_{Gumbel}(z; b) = (1/b)(\exp(-(z/b + e^{-z/b})))$. In probability theory and statistics, the Gumbel distribution (Generalized Extreme Value distribution Type-I) is used to model the distribution of the maximum (or the minimum) of a number of samples of various distributions. The potential applicability of the Gumbel distribution to represent the distribution of maxima relates to extreme value theory, which indicates that it is likely to be useful if the distribution of the underlying sample data is of the normal or exponential type.

In an embodiment where a Laplace noise generating technique is used, a noise distribution is considered from a Laplace random variable, where Lap(b) has PDF $p_{Lap}(z; b)$, and $p_{Lap}(z; b) = (1/2b)(\exp(-|z|/b))$. The value of z is a random value that can take on several values according to some distribution, with some values being more likely than others. The PDF p(z; b) roughly indicates how likely the random value will be the value z. Without p(z;b), it is not known how to sample the random variable. Additionally, the parameter "b" is replaced with $1k$ where E is the differential privacy parameter.

The Laplace distribution is a continuous probability distribution named after Pierre-Simon Laplace. The Laplace distribution is used in probability theory and statistics. While adding Laplace noise to a count ensures differential privacy, adding Gumbel noise to a count does not. However, releasing an order of data items based on noisy base values (but not the noisy base values themselves) generated by adding Gumbel noise ensures differential privacy.

At block 230, for each base value, the noise value generated for that base value is added to that base value to generate a noisy base value. Thus, if there are ten data items, then there are ten base values, ten noise values, and ten noisy base values.

At block 240, the noisy base values are sorted. Block 240 may involve sorting the noisy base values in descending order, with the largest noisy base value first. Alternatively, block 240 may involve sorting the noisy base values in ascending order, with the smallest noisy base value first. The type of sorting may depend on the query specifications. For example, if the query requests the top K, then the noisy base values are sorted in descending order; if the query requests the bottom K, then the noisy base values are sorted in ascending order.

Figure 3B:
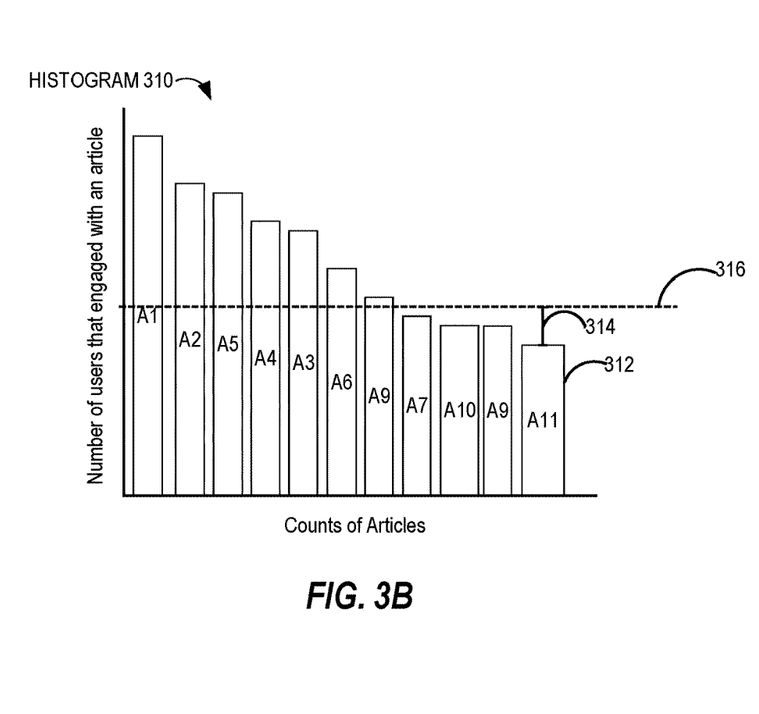

FIG. 3B is a diagram that depicts an example histogram 310 that comprises eleven noisy counts, each corresponding to a different data item. Each noisy count is computed based on adding the corresponding count and the generated noise value for the corresponding article. The noisy counts of most articles have changed relative to the original, true counts. A count for an article may be the same as before if the noise value generated for the article is 0. Histogram 310 depicts the articles sorted by noisy count. Because the noisy counts are different than their corresponding counts, the order of the articles is different.

At block 250, a noisy base value threshold (or "noisy threshold") is generated based on the base value of the $(k*+1)^{th}$ data item. For example, if ten data items are requested, then the base value of the eleventh data item is identified. To generate the threshold noisy base value, a particular noise value is generated and the particular noise value is added to the base value of the $(k*+1)^{th}$ data item to generate the threshold noisy base value.

How the particular noise value is generated may depend on the sensitivity setting of the current query. For example, for the unrestricted sensitivity setting, the noisy threshold may be equal to the sum of the $(k*+1)^{th}$ base value, 1, and the ratio of (1) the natural log of k divided by δ and (2) ε. In mathematical terms, the noisy threshold=$(k*+1)^{th}$ base value+1+ln(k*/δ)/ε.

For the Δ-restricted sensitivity setting, the noisy threshold may be the sum of the $(k*+1)^{th}$ base value, 1, and the ratio of (1) the natural log of Δ divided by δ and (2) ε. In mathematical terms, the threshold noisy base value=$(k*+1)^{th}$ base value+1+ln(min(Δ, k*)/δ)/ε, where Δ refers to the number of values or counts that a single user can affect (such as the number of countries the user can be associated with or the number of companies in which the user can be currently employed), and where k*+1 is the number of results that a query requests, such as 8,000.

δ and ε are privacy parameters. The smaller the values of δ and ε, the higher the threshold noisy base value, resulting in more privacy, but less useful (or less accurate) information. The larger the values of δ and ε, the lower the threshold noisy base value, resulting in less privacy, but more useful (or more accurate) information.

Histogram 310 depicts a threshold noise value 314 and a noisy threshold 316. The threshold noise value 314 is added to count 312 (i.e., the base value of the eleventh data item) to yield noisy threshold 316. In this example, the order of the eleventh data item has not changed from histogram 300 to histogram 310. However, in other examples, the eleventh data item may change.

At block 260, the data items having noisy base values that are above the threshold noisy base value are released, or returned, as a result of the query. For example, if there are eight noisy base values that are greater than the threshold noisy base value, then identities of the corresponding data items are returned in response to the query. As a specific example, a query requests the top ten articles shared by CEOs in India, but only the top eight articles are returned, sorted by noisy base value. (The noisy base values are not returned.)

In the example of histogram 310, seven articles are returned: articles A1-A6 and A9, since the noisy counts of those articles are greater than the threshold noisy base value 316.

However, if no noisy base value is above the threshold noisy base value, then no data item is released or returned. In other words, the query result would be empty.

One edge case is where the base values are roughly equal in value. Then, even with noise values added to the base values, the threshold noisy base value is greater than all the noisy base values. In this case, no results are returned because every noisy base value is less than the threshold noisy base value.

Privacy Budget

In an embodiment, a requester is given a privacy budget that dictates how many queries (or requests) the requester can submit and/or how many results the requester can receive. A requester is an individual or a group that is allowed to submit requests to server system 130. An example of a group is an organization, such as a company, an academic institution, and an association.

These two types of limits are referred to, respectively, as a query limit and a result limit. For example, a requester is limited to submitting fifty queries per week and receiving seven thousand results per week, where each result is a different count.

A requester may be associated with a dashboard that refreshes a set of queries on a regular basis or on a manual basis. For example, there are ten queries in the set and each query requests top one hundred data items that satisfy different criteria. Thus, a single refresh of the ten queries reduces the privacy budget of the requester by one thousand units.

Instead of the privacy budget being the in unit of a query result, a unit of the privacy budget may be $\epsilon$. For example, ten results from a query may mean that $10\epsilon$ are deducted from the requester's privacy budget.

In an embodiment, the result limit is reached based on a number of results that are returned from one or more queries, not the number of results that are requested by the one or more queries. For example, a requester submits a query that requests one hundred results but, based on a noisy threshold, only eighty results are returned. Thus, the requester's privacy budget is deducted eighty units (or $80\epsilon$), not one hundred units. In this way, a requester is not "charged" for results that are not returned.

In the scenario where no results are returned due to a threshold noisy value, the requester receives some information; namely that the requested data is relatively uniform. Zero results from a query may still mean that a single E is deducted from the requester's privacy budget.

In an embodiment, under a $\Delta$-restricted sensitivity setting, the number of units that are deducted from a requester's privacy budget as a result of a query is delta ($\Delta$). For example, if a delta is three, then three units are deducted from the privacy budget even though more or fewer results than three were returned as a result of a query.

Optimizing the Noisy Threshold

In some scenarios, a query does not specify a number of data items (or counts or values) to return. In other scenarios, designers of server system 130 wish to provide more data items (or counts) than what a query requests. In such scenarios, the optimal $k*$ value is found and used to calculate the noisy threshold.

In an embodiment, the optimal $k*$ value is selected to minimize the noisy threshold across multiple (e.g., all) possible threshold noisy values. Thus, instead of determining a noisy threshold based on the number of data items that a query requested, the noisy threshold is selected based on analyzing multiple possible noisy thresholds and selecting the possible noisy threshold that results in the lowest noisy threshold.

Conceptually, a noisy threshold that is calculated based on a data item that has one of the highest counts (or values) will be relatively high while a noisy threshold that is calculated based on a data item that has one of the lowest counts will be relatively low. However, there is typically a point in the distribution of the counts (or values) where the counts begin to be the same, typically zero counts or counts that are near zero. Where the counts "plateau" is where the noisy threshold begins to increase. Specifically, in the portion of the formula above that includes a $k*$, as $k*$ increases, the noisy threshold increases. For example, at the end of a sorted histogram where the counts are close to zero, even though the counts are close to zero, as $k*$ increases, the resulting noisy threshold will increase. If the highest $k*$ is selected to compute a noisy threshold, then more data items will be removed from the result set. Thus, there is a $k*$ that yields the maximum number of data items.

In order to find such a $k*$, multiple (e.g., all possible) noisy thresholds, at different $k*$, are calculated. In mathematical terms, $k*$ is chosen to minimize the following formula: $h_{k}*_{+1}+1+(\ln(k*/\delta))/\epsilon$, where $h_{k}*_{+1}$ is the ($k*+1$)th highest count, or base value.

Capping Base Values

In some scenarios, a single user may modify the count of certain data items more than once. For example, a user may create a virtually unlimited number of comments for an online article. As another example, a user might click on a video multiple times. In an embodiment, to ensure differential privacy in such scenarios, the number of actions that are attributed to a single user is reduced or "capped" to a particular number, such as five, two, or one. For example, a first user commented on an online article eight times, a second user commented on the online article two times, and a third user commented on the online article twenty-two times. In this example, the eight count is reduced to a three count, the two count is not modified, and the twenty-two count is also reduced to a three count. In this way, the counts are artificially reduced in order to better ensure differential privacy. If counts were not "capped," then the noisy threshold would be higher, resulting in fewer results being returned in response to a query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
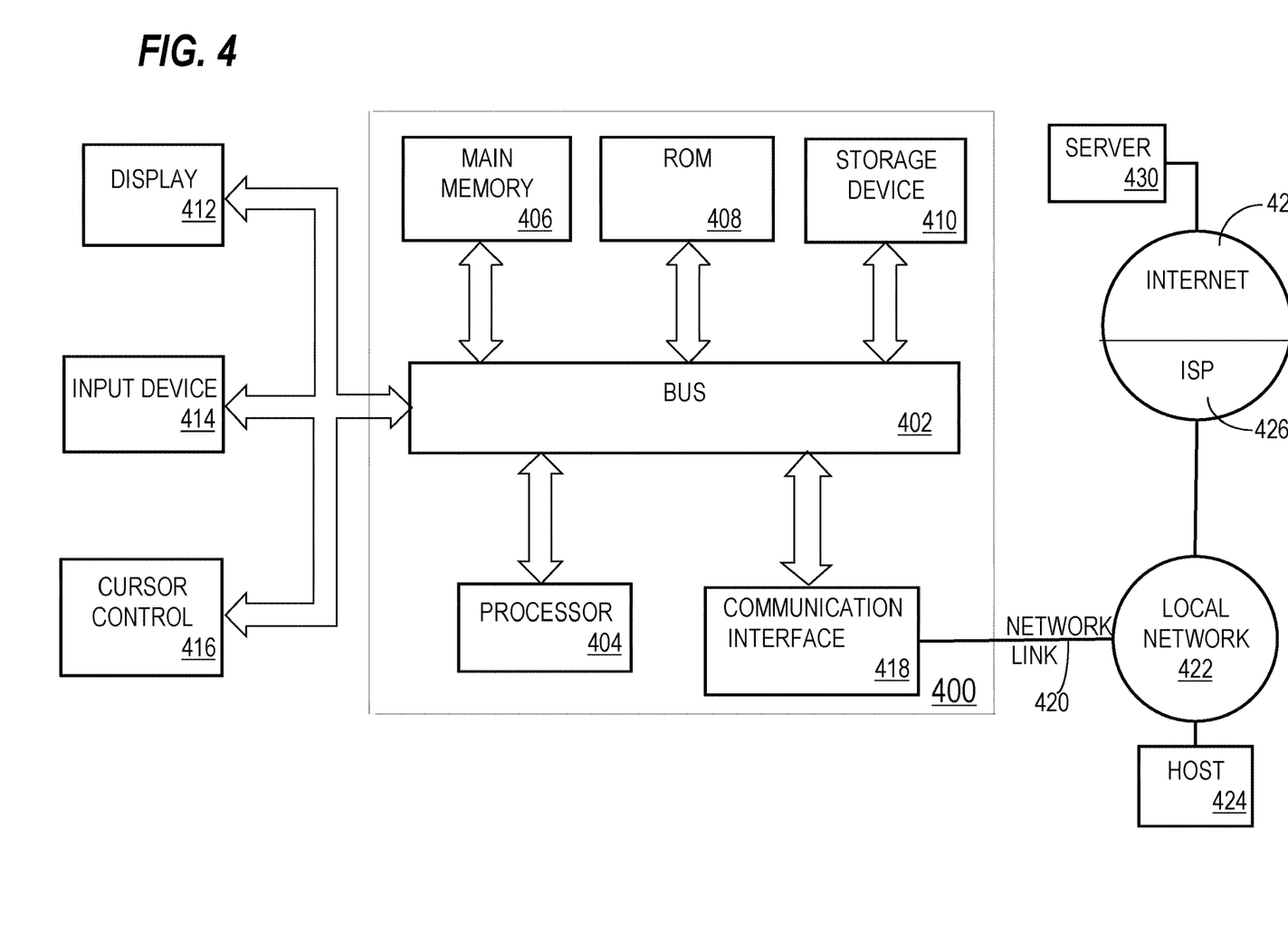
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to a query that specifies one or more criteria, identifying a plurality of items and a plurality of counts, wherein each count of the plurality of counts corresponds to a different item in the plurality of items;
for each count of the plurality of counts:
generating a noise value using a noise generating technique and adding the noise value to said each count to generate a noisy value;
updating a set of noisy values to include the noisy value;
sorting the set of noisy values;
generating a particular noise value for a particular count;
adding the particular noise value to the particular count to generate a noisy threshold;
based on the noisy threshold, identifying a first strict subset of the set of noisy values, wherein each noisy value in the first strict subset is less than the noisy threshold;
generating a response, to the query, that is based on a strict subset of the plurality of items, wherein the strict subset corresponds to a second strict subset of the set of noisy values, wherein the second strict subset is distinct from the first strict subset, wherein the response excludes items that correspond to the first strict subset;
wherein the method is performed by one or more computing devices.

2. The method of claim 1, wherein the noise generating technique is a Gumbel noise generating technique.

3. The method of claim 1, wherein the noise generating technique is a Laplace noise generating technique.

4. The method of claim 1, further comprising:
generating a particular value based on a natural log of a ratio of a first value and a first privacy parameter;
wherein the noisy threshold is generated also based on the particular value.

5. The method of claim 4, further comprising:
determining a number of data elements that an individual user can influence in a data domain;
determining an index value associated with the particular count;
determining a minimum of the number of data elements and the index value;
wherein the first value is the minimum.

6. The method of claim 1, further comprising:
storing a privacy budget in association with each requester of a plurality of requesters;
identifying, from among the plurality of requesters, a particular requester that is submitted the query;
identifying a particular privacy budget that is associated with the particular requester;
updating the particular privacy budget based on a number of items in the strict subset of the plurality of items.

7. The method of claim 1, further comprising:
storing a privacy budget in association with each requester of a plurality of requesters;
identifying, from among the plurality of requesters, a particular requester that is submitted the query;
identifying a particular privacy budget that is associated with the particular requester;
updating the particular privacy budget based on a number of items in the plurality of items that an individual user can influence.

8. The method of claim 1, further comprising:
generating a plurality of candidate noisy thresholds that includes the particular modified count;
selecting, from among the plurality of candidate noisy thresholds, a particular candidate noisy threshold that is the lowest among the plurality of candidate noisy thresholds.

9. The method of claim 1, further comprising:
prior to generating the noise value, for each count in a set of counts:
determining whether each count in the set of counts is above a particular threshold;
replacing said each count with a value that equals the particular threshold if said each count is greater than the particular threshold.

10. The method of claim 1, wherein a first noise value for a first count of the plurality of counts is different than a second noise value for a second count of the plurality of counts.

11. One or more storage media storing instructions which, when executed by one or more processors, cause:
in response to a query that specifies one or more criteria, identifying a plurality of items and a plurality of counts, wherein each count of the plurality of counts corresponds to a different item in the plurality of items;
for each count of the plurality of counts:
generating a noise value using a noise generating technique and adding the noise value to said each count to generate a noisy value;
updating a set of noisy values to include the noisy value;
sorting the set of noisy values;
generating a particular noise value for a particular count;
adding the particular noise value to the particular count to generate a noisy threshold;
based on the noisy threshold, identifying a first strict subset of the set of noisy values, wherein each noisy value in the first strict subset is less than the noisy threshold;
generating a response, to the query, that is based on a strict subset of the plurality of items, wherein the strict subset corresponds to a second strict subset of the set of noisy values, wherein the second strict subset is distinct from the first strict subset, wherein the response excludes items that correspond to the first strict sub set.

12. The one or more storage media of claim 11, wherein the noise generating technique is a Gumbel noise generating technique.

13. The one or more storage media of claim 11, wherein the noise generating technique is a Laplace noise generating technique.

14. The one or more storage media of claim 11, wherein the instructions, when executed by the one or more processors, further cause:
generating a particular value based on a natural log of a ratio of a first value and a first privacy parameter;
wherein the noisy threshold is generated also based on the particular value.

15. The one or more storage media of claim 14, wherein the instructions, when executed by the one or more processors, further cause:
determining a number of data elements that an individual user can influence in a data domain;
determining an index value associated with the particular count;
determining a minimum of the number of data elements and the index value;
wherein the first value is the minimum.

16. The one or more storage media of claim 11, wherein the instructions, when executed by the one or more processors, further cause:
storing a privacy budget in association with each requester of a plurality of requesters;

identifying, from among the plurality of requesters, a particular requester that is submitted the query;

identifying a particular privacy budget that is associated with the particular requester;

updating the particular privacy budget based on a number of items in the strict subset of the plurality of items.

17. The one or more storage media of claim 11, wherein the instructions, when executed by the one or more processors, further cause:

storing a privacy budget in association with each requester of a plurality of requesters;

identifying, from among the plurality of requesters, a particular requester that is submitted the query;

identifying a particular privacy budget that is associated with the particular requester;

updating the particular privacy budget based on a number of items in the plurality of items that an individual user can influence.

18. The one or more storage media of claim 11, wherein the instructions, when executed by the one or more processors, further cause:

generating a plurality of candidate noisy thresholds that includes the particular modified count;

selecting, from among the plurality of candidate noisy thresholds, a particular candidate noisy threshold that is the lowest among the plurality of candidate noisy thresholds.

19. The one or more storage media of claim 11, wherein the instructions, when executed by the one or more processors, further cause:

prior to generating the noise value, for each count in a set of counts:

determining whether each count in the set of counts is above a particular threshold;

replacing said each count with a value that equals the particular threshold if said each count is greater than the particular threshold.

20. The one or more storage media of claim 11, wherein a first noise value for a first count of the plurality of counts is different than a second noise value for a second count of the plurality of counts.

* * * * *